Patented June 5, 1945

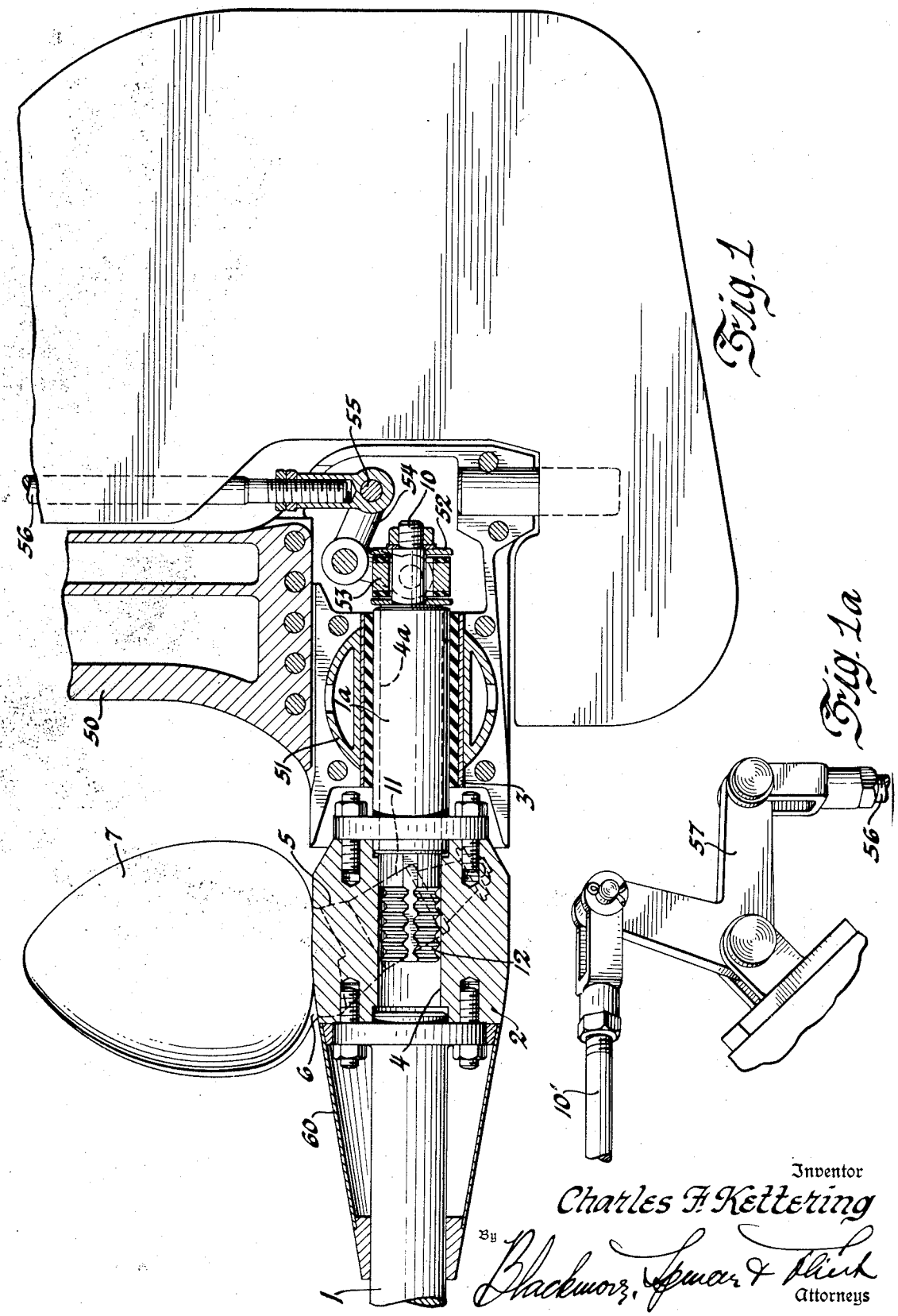

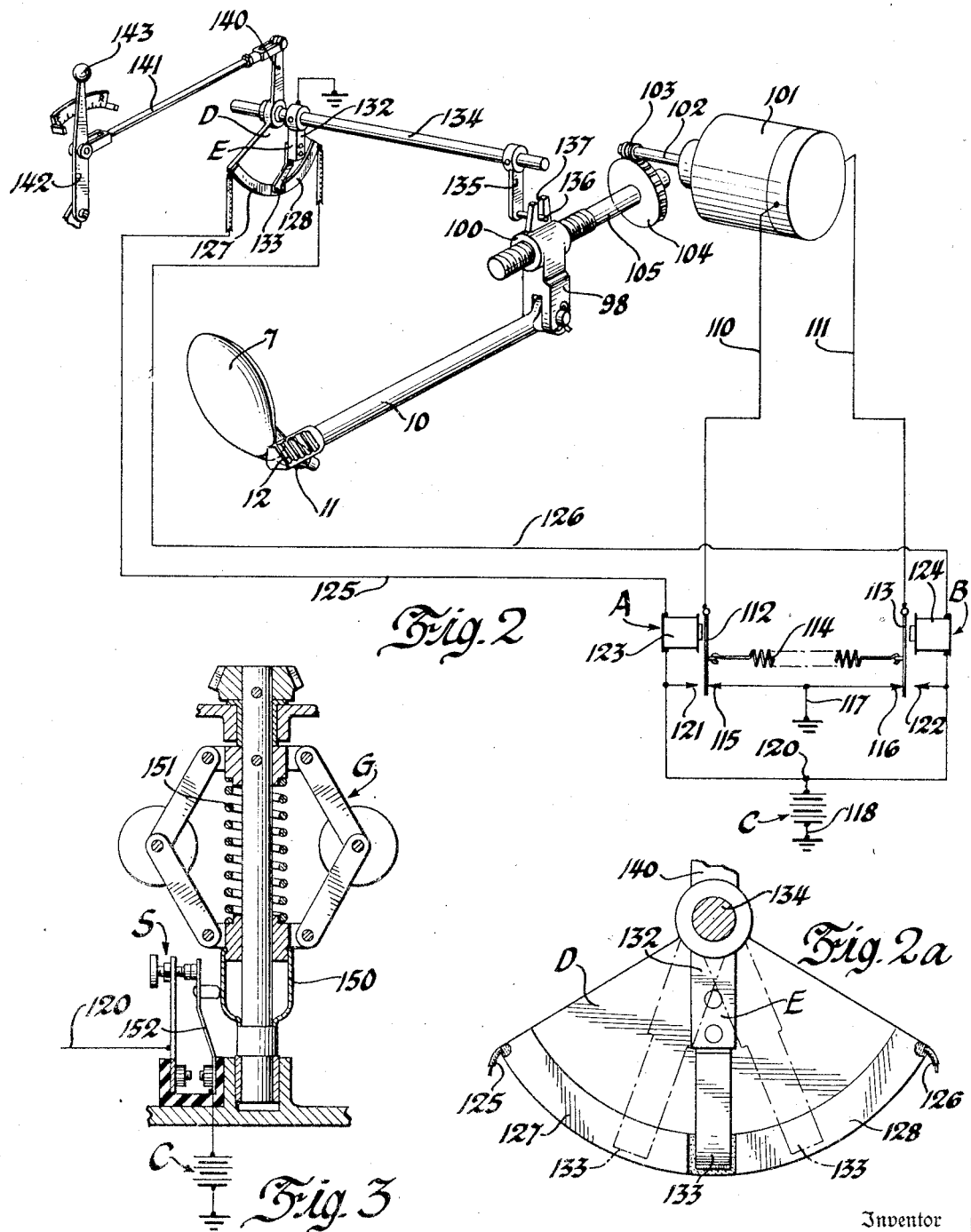

2,377,633

UNITED STATES PATENT OFFICE 2,377,633

VARIABLE PITCH PROPELLER CONTROL

Charles F. Kettering, Dayton, Ohio, assignor to General Motors Corporation, Detroit, Mich., a corporation of Delaware Application May 19, 1941, Serial No. 394,047

18 Claims. (Cl. 170—135.6)

The present invention relates to controls for variable pitch propellers, and more particularly in the present demonstration, to such devices for marine vessels.

It is an object of the present invention to provide a control means equipped with auxiliary power actuation means, subject to operator control, especially adaptable to variable pitch propeller systems in which the blade thrust and centrifugal effects tend to equilibrate in the normal pitch ranges of such mechanisms, leaving only small incremental forces, easily controlled by low power auxiliary servo means.

It is a further object of the invention to provide a system of auxiliary power actuation for the above purposes, in which the operating forces on the blades of variable pitch propellers, and the reacting forces therefrom exert a minimum effect on the positioning and pitch holding devices, the mechanism between such force generation and the auxiliary power actuation means being adapted to self-lock except when the said actuation means is deenergised by the control action of the operator.

An additional object of the invention is to provide in a control and actuation system as above outlined, mechanism intervening between the source of auxiliary power and the reactive propeller forces, capable of absorbing the latter and of holding selected pitch, wherein in the said intervening mechanism, the parts of which subject to dynamic motion are of low inertia.

Another object is to provide in devices of the character above described, means to counteract overtravel of the pitch setting mechanism and to provide adverse mechanical advantage for the reactive forces which may react upon the auxiliary power means, such that at all times the latter means is capable of overcoming such reactive forces, and of resetting the blades of the propeller in any desired pitch position.

A further object is the provision of a control and actuation system for the purposes above specified, in which overtravel of the actuator mechanism is immediately compensated for by reversal of pitch actuation to the pitch value selected by the operator.

An additional object is the provision of auxiliary power pitch control and actuation means yielding a full range of forward and reverse pitch shift positioning, and a governor device arranged to prevent or inhibit any change of pitch except during a given low speed range of the said governor, for either forward or reverse pitch changes, and to permit such changes only during a higher speed response of said governor.

Another object is to provide a manual control for the above-noted auxiliary powered pitch shift mechanism, capable of selecting a desired pitch positioning of the said propeller blades within a normal range of both forward and reverse pitch positions, the selected pitch setting being preset by the operator, and automatically held at the selected point thereafter by the afore-said mechanism until the operator shall reset the said manual control to a new pitch control point.

A further object is the provision of a manual pitch selecting controller adapted to prevent undesirable motion of the engine throttle control when the selected pitch is preset in predetermined manual pitch settings.

It is likewise an additional object of the invention to provide a manual control for the devices and mechanisms described in which no normal reactive effect upon the presetting manual control means is had, and further in which the said means is latchable in a series of preset pitch positions, to be ordinarily unlatched by the operator at the time of selecting a new pitch position.

In connection with the above objects, it is an object of the invention to provide operator-operable presetting pitch control means by which the auxiliary power mechanism may be inhibited for a time interval from executing a desired pitch change actuation action, until the speed control devices for the power plant driving the variable pitch propeller have performed a cyclic speed control action.

Further and additional objects will appear in the accompanying specification, as explaining the operation of the devices and mechanisms shown in the appended drawings.

The advantages ensuing from the above-noted constructions are manifold, in that in modern marine vessels especially, the need for maneuverability with sureness of response for reliable control of propeller pitch change, is most urgent, especially for high speed vessels required to change direction and speed quickly in military maneuvering. It is observed, however, that the advantages accruing from the use of the herein-described constructions are not confined to high speed vessels, but are attainable in low speed vessels of cargo type, proportionately.

The obvious advantages of the variable and reversible pitch propeller, especially for marine use, have been known for many years, in that it obsoletizes bulky reversing gear, engine or gearbox; reduces power-plant weight and space requirement, and increases overall fuel efficiency. These advantages have not, however, been realized in commercial or military practice, until the recent appearance of a form of propeller construction in which the slipstream efficiency is high, and the values of thrust and centrifugal forces are sufficiently equilibrated to enable the incremental reactive forces to be handled by small auxiliary power means for changing pitch.

The demonstration herewith describes such a form of propeller construction, and applies to it an auxiliary power control having various novel features, indicated above, and providing for the first time, more particularly for a marine vessel, a neat, small control installation, fully effective to provide the above-mentioned objects.

The broad idea of combining variable pitch propeller blade thrust with centrifugal blade force for the purpose of obtaining an automatic change of pitch for a number of varying torque and speed conditions is conceded as being old in the arts. The present invention does not lie in that field. It is, however, directly related to propeller forms in which these forces are arranged to cancel each other out over a range of effective pitch, so that the force to be overcome by the shift actuation means will be small, and never rise above the available auxiliary power requirement. Having a low, auxiliary power need, the device of the present invention dispenses with the customary limit stops ordinarily used to prevent the blades from going beyond their useful range, and is arranged to accept and absorb reaction thrust and centrifugal forces originating in the blades, on an increment basis, directly in the pitch actuation mechanism itself. If limit stops are used with the present invention, they merely serve as safety stops not needed in the ordinary operation of the invention.

The invention utilizes a reversible electric motor connected to a mechano-electrical follow-up actuation system, and controlled by a hand controller which has unlimited motion over the full range of forward and reverse pitch, the follow-up part of the device likewise having equivalent full motion. When these two elements are in step, the mechano-electrical system is normally locked against movement, but immediately they are out of step, the actuation portion of the invention puts them back in step, at the same time adjusting pitch to the operator's desired setting.

While the present invention does not disclose any form of automatic pitch control, it is pointed out now, and should be understood, that the control device designated herein as manually operable, may, because of its continuously shiftable action, move into an infinite number of pitch control positions within the pitch range of the propeller blades described, and since it is entirely unloaded by the forces generated in the remainder of the mechanism of the disclosure, any form of automatic pitch shift may be used, subject to speed response, to torque, to thrust, to engine throttle position, or to any other concurrent index combining indices taken from such automatic indices, such as are described in the dynamometric arts.

It is further pointed out, that because of the above no-load and infinite pitch position controller features, the present invention is readily adapted to vessels having two power plants and two propellers, port and starboard, such that automatic steering may be augmented by non-synchronous pitch control and through remote control devices conjointly acting.

Figure 1 is a vertical section of the variable pitch propeller of the demonstration, as applied to a marine vessel, showing the means to control the pitch. Figure 1a is a view of the linkage connected to the propeller pitch control of Figure 1.

Figure 2 is a schematic diagram of controls for the propeller construction of Figure 1, showing a mechano-electric pitch servo actuation system utilizing follow-up motion with respect to a manually operable control device. Figure 2a shows a detail of the master control switch of Figure 2.

Figure 3 is an elevation section describing a governor control for the system of Figure 2, arranged to limit the interval in which change of pitch can occur, to a predetermined low speed interval of the power plant driving the propeller of the installation.

The following description covers the application of the invention to a ship installation, Figure 1 showing a vertical section view of the self-stabilizing variable pitch propeller as mounted at the stern of a marine vessel, with the pitch control means shown therein as a rod 56 extending vertically to some control point within the hull of the ship.

Figure 4:
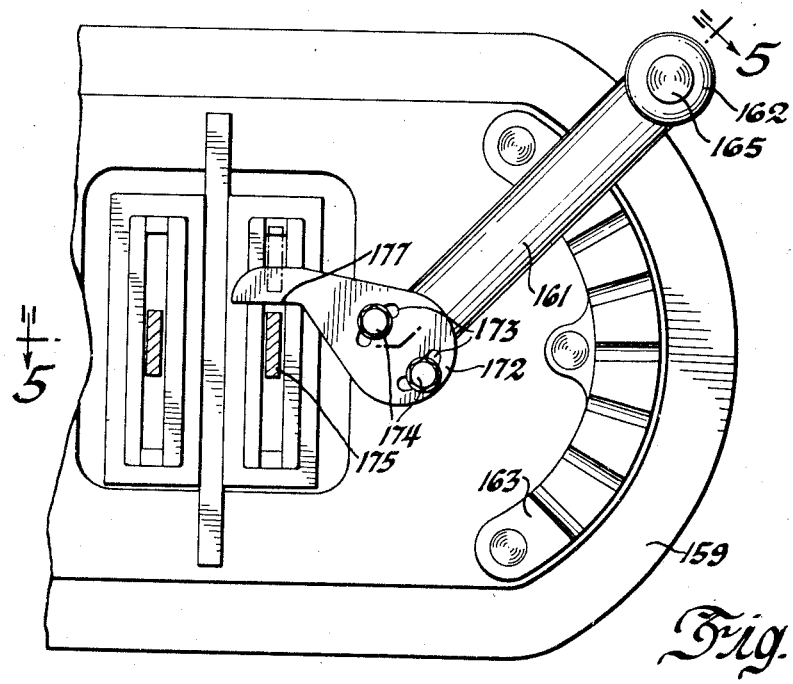
Figure 4 is a plan view of a portion of the combined pitch and throttle controls for the invention as installed in a ship's control cabin.

The small diagram of Figure 1a shows the connecting of rod 56 through appropriate crank-arm piece 57 and rod 10' to a longitudinally movable mechanism, such as may be actuated by and connected with the servo pitch control devices of Figures 2 to 4. It is obvious from Figure 2 that rod 10 may be substituted for rod 10' of Figure 1a.

A detailed description of Figures 2 and 4 is provided later in this specification.

Propeller shaft 1 is bolted to the hub 2, in turn bolted to stub-shaft 1a, supported in frame member 50 of the ship's hull, by spherical bearing 51.

The blades 7, carried in symmetrical bores 5 of hub 2 are equipped with segmental teeth 11 meshing with rack teeth 12 of rod 10 which passes through bore 4a or stub-shaft 1a, protruding at the right and equipped with collar 52 in which fork 53 engages, for pitch shift control.

The sternpost framing extension 50 also supports the ship's rudder. Fairing 60 is attaching to hub 2 and shaft 1 for proper leading waterstream contour.

Blades 7 have spindle-shafts 8 on which teeth 11 are segmentally arranged to intersect the teeth 12 of rack rod 10, so that all of the blades may be compelled to turn through synchronous pitch angles.

The shaft 1 as the driving shaft is affixed to hub member 2, and rotates the hub, delivering all torque thereto as in Figure 1. The hub member 2 may be supported on a bearing such as indicated at 3, to absorb torsional loads, and to stiffen the drive to the propeller blades.

The hub is bored axially at 4 as in Figure 1 for reasons to be described further, and is taper bored at 5, and at two other symmetrical points, to accommodate the stub ends 6 of the blades 7, in the present demonstration, three in number. The centerlines of the bores 5 are symmetrically inclined with respect to each other and to the hub centerline of rotation so that a full bearing for each blade 7 is provided by the hub structure. In the drawing of Figure 1 the external contour of the hub 2 is shown as being faired to ogival form. It may be further contoured with respect to the hub centerline for maximum slipstream efficiency.

The hub blades 7 are mounted in the hub bores 5, and are capable of occupying a number of forward and reverse pitch positions.

With force being applied by rotation of shaft 1 against the resistance to be overcome, it will be understood that the thrust on the blades 7 may apply a twisting or rotatory component to blades 7, because of the resistance of the water, air or other media in which the propeller is to work, and the helix angle of the blades; therefore the blades 7 would tend to move from the forward pitch positions to positions of lesser pitch when shaft torque in the forward direction is applied. The mass of the blades, however, exerts a couple about the blade spindle axes opposing the thrust effect, leaving only a minimum force of low magnitude to be borne by the rack mechanism, for holding any required pitch setting.

Centrifugal force on blades 7 therefore assists in the equilibrating of the thrust forces which tend to shift pitch from the desired value.

As described in United States Letters Patent application Serial Number 274,883 to E. V. Rippingville, filed May 22, 1939, the relationship between normal blade center of pressure, offset angle of the blade shafts and mass of the blade spindles is such that under forward torque the net reaction force tends to hold the rack in the position set, aided by centrifugal blade force.

When the engines are decelerated to idling, the transfer of load from the advancing faces of the blades to the opposite sides may tend to put a rotatory couple on the blades tending to rock them in the opposite direction. In this case, the centrifugal force diminishes, the overtaking torque couple exerting a force working with the remaining centrifugal force to stabilize pitch. In both cases, the forces on the blades tend to shift somewhat but are of a low magnitude, as will be understood. It should be remembered that unless the power plant drive to the shaft 1 be absolutely stopped, or declutched, the ships's engines will always have a given idling rotation, the effect of which when opposed to the reactive couple on the blades, will tend to hold the blades in a given position not at the neutral pitch point, but at some forward helix angle where the slipstream and the propeller shaft forces tend to balance. This will be a small or a large angle according to the speed of the propeller shaft, the velocity of the slipstream and the normal offset of the blade axis with respect to the stub or spindle axis.

The central bore 4 of the hub 5 supports rod 10 shiftable by external means as noted above, and the hub bores 5 open into the central bore 4 to accommodate the pinion segments 11 integral with blade stubs 6, and to accommodate rod 10 and rack 12 which meshes with the segments 11 of all of the blades.

When rotational force is applied to shaft 1, the reaction of the force components on the blades 7 may tend to rock them to a given pitch position; but with the overtaking torque such as would obtain when the power to shaft 1 would be shut off, the motion of the water or other medium past the blades 7 may apply a counterrotatory force tending to rock them to a somewhat different position.

The rod 10 and the rack 12, unless otherwise prevented from yielding to the reactive component, will then tend to follow the rotation of the segments 11 until the blades 7 turn through their maximum allowable range with respect to the centerlines of the stubs 6 to some force balancing angle. The operator's control may then shift the blades until they have passed through the null force positions and are reset so that when power be again applied to rotate hub 2 in the forward direction the preceding noted reversal of the forces will cause the thrust balancing effect to be applied to the blades in their new pitch positions.

This reversing of thrust characteristic will be understood when the function of rod 10 and its control of the blades is analysed. When, for example, the construction above described be applied to the drive for a ship, driven by an internal combustion power plant, the reduction of the throttle control to idling, with way on the boat, will tend to rock the blades of the composite propeller to a somewhat different balancing position.

Assuming that the rod 10 and the rack 12 are externally controlled so that the incremental reactive force cannot shift the blades toward the idling or null point unless the operator releases or shifts the external control mechanism, the blades will then tend to stay in full efficiency driving position, and not shift to the low efficiency idling position, with opening and closing of the speed control for the engine's driving shaft 1.

This has the advantage of connecting the rod 10 and rack 12 so as to be locked by the controls in any pitch position, so that the power plant may start and drive shaft 1 without propelling the ship, the mechanism furnishing a no-drive or neutral control similar to that of an automotive main clutch, or by analogy the null ratio control of an infinitely variable transmission. This makes it possible to warm up an engine or group of engines with the drive gear, while permitting the propeller to idle with no shaft torque other than that of drag in the water, without propelling component.

Now if the operator release the external locking means holding rod 10, rack 12 and blades 7 in idling or null position, and shifts the control to "forward," the engine speed control need not be immediately advanced, the auxiliary power control to be described serving to rotate blades 7 into forward position.

In Figure 1 rack 12 and rod 10 are connected to bellcrank 54 pivoted on the framing of the ship, the vertical rod 56 transmitting force applied upwardly through anti-clockwise motion of bellcrank 54 to collar 52 through pivot 55 of rod 56.

Now if the operator shift the rod 10 and rack 12 to rock the blades 7 and the segments 11 to reverse, that is, to positions where the helix angle of the blades is that of an opposite hand, the thrust effect becomes reverse to that described above for forward drive, and the centrifugal force moment arm because of the blades 7 being moved across their spindle lines, now is exerted to oppose the reverse thrust, so that a stabilization effect still continues, the actuating and pitch holding system still being required to sustain the marginal forces, and not the full thrust forces.

Drive in reverse at variable pitch may proceed indefinitely until the operator desires to make a new shift to neutral or forward pitch.

As in forward drive, the external control for rod 10 is arranged to stop the actuation mechanism by the mechanical principle of irreversibility and through mechanical advantage, as will be understood from the following description of the external controls.

The schematic diagram of Figure 2 describes the general manual control arrangement for the structures shown in Figures 1 and 1a.

The rack 12 of rod 10 is meshed with the toothed segments 11 of the blades 7, and reciprocates in order to place the blades in any desired pitch position, moved by articulated pivot fitting 98 attached to, or integral with traveler nut 100.

The actuation force for this motion is provided by direct current motor 101, the power shaft 102 of which is fitted with worm 103 meshing with worm wheel 104 of threaded shaft 105; on which nut 100 travels.

Shaft 105 is supported in appropriate bearings which hold it parallel to the direction of motion of rack rod 10.

The direct current motor 101 is energised by two feeder wires 110 and 111 connected to the armatures 112 and 113 of two relays A and B.

The pivoted armatures 112 and 113 are connected together by spring 114 which tends to hold both or one in contact with the contacts 115 and 116 connected to the ground terminal 117.

The source of current may be any reliable generator of actuating direct current, shown in the diagram of Figure 2 as a battery C.

One terminal 118 of the battery is grounded, the other terminal 120 feeding branched circuits to each of the contact points 121 and 122 of the two relays, and likewise connected to the core windings 123 and 124 of the relays A and B.

The opposite ends of each of the core windings 123 and 124 are joined to the controller circuits 125 and 126 which are connected to contact points 127 and 128 of the controller.

The controller mechanism consists of a rotatable contact device D having the two spaced-apart contacts 127 and 128, with a space between of given circumferential dimension taken from the center of rotation of the device. On the same center, a second rotatable element E is mounted, having a contactor arm 132 with contact 133 of sufficient width to occupy the space between the contacts 127 and 128 of the device D. The element E is insulated and its contact arm 132 and contact 133 are connected to the ground so that when the arm 132 connects to either of contacts 127 or 128 the battery circuit through the core widings 123 or 124 of one of the relays A or B will be completed.

The contact device D likewise includes a shaft 134 on which is mounted an arm 135 having a finger 136 capable of swinging in an arc, and intersecting the linear motion of traveler nut 100. On the upper side of the nut 100 is provided a slot 137 in which the finger 136 of arm 135 may move, the linear range of motion of the nut 100 being taken such that the finger 136 is always restrained in radian motion on its own center within the limits of linear motion of the nut 100.

The contact device D is rocked by its lever 140 pivoted to rod 141, pivoted in turn to handlever 142 pivoted at some convenient point to directive operation of the vessel.

It will be observed that the control system thus far described is a mechano-electrical follow-up servo means, for causing the pitch setting of the propeller blades 7 to follow and to hold to the manual setting by the operator of handle 143 of lever 142, transmitted to control device D.

As explained above, the propeller mechanism of the hub 2 of Figure 1 is so arranged that a very low reactive force is transmitted to the rack rod 10 from the thrust and centrifugal forces applied to the blades 7 by the operating conditions of the vessel.

Whatever the magnitude of such forces may be, the nut 100 and screw threads of shaft 105 are of such pitch relationship, that the reactive forces are sustained on the mounting of shaft 105 as thrust, and the incremental forces not so sustained, and transmitted into a small rotational component applied to shaft 105, are resisted by the adverse mechanical advantage achieved in the worm and worm wheel relationship between shaft 105 and motor shaft 102.

It is therefore clear that the electric motor 101 for this work can be small, of low power and is not required to withstand the reactive forces resulting from thrust and centrifugal forces of the blades 7 of hub 2. The motor 101 need only have sufficient power to execute the will of the operator, for which it exerts its force on the rack rod 10 through two steps of mechanical advantage, in the worm drive and in the screw-and-nut mechanism.

These features provide a self-stabilizing action which tends to reduce excess hunting and wear on the mechanism. In actual practice, the device tends to self-lock in whatever position the manual control determines, and there is a minimum of jockeying back and forth of the controls, under normal and ordinary operating conditions.

It will be seen that the handlever 142 in the operator's compartment need only be provided with the indicator shown, calibrated in actual pitch angles, if desired, and the operator simply sets the handle to the required pitch setting, the contact device D, relays A and B and motor 101 going into action at once to move the blades 7 to the pitch setting called for by the handle 143.

Assuming that as shown in Figure 2 the setting is in "neutral" pitch, the moving of handle 143 to the right a given distance rocks the contact device D clockwise, connecting contact 128 with 133 of arm 132, and the battery current to the coil winding 123 of relay A. The armature 112 is drawn to the left, connecting the battery current across contact 121 to circuit 110, causing the motor 101 to rotate worm 103 and worm wheel 104, the shaft 105 rotating within nut 100, and nut 100 moving to the left along shaft 105.

During this interval, as nut 100 shifts finger 136 and arm 135 to the left, the contact 133 of arm 132 will break the circuit by moving far enough to separate from contact 128, again occupying the space between the contacts 127 and 128, and cutting off current to core winding 123, which permits spring 114 to disconnect 112 from 121.

Upon this interruption of the power circuit, motor 101 stops and the mechanical system of connections between the worm 103 and the rack rod 10 comes quickly to rest because of the fact that the moments of inertia involved, are quite low, and the reactive lock effects of the screw-and-nut and worm-wheel become immediately active. The mechanism comes to rest with the pitch of the blades in a position corresponding to the setting of handle 143.

The tendency on the part of the mechanical system to self-lock not only assures the instant stopping of blade shift in the desired pitch angle positions, but also prevents overtravel of the contact arm 132 and contact 133 which otherwise would set up the circuit at contact 127 for energising relay B and causing motor 101 to run in reverse.

These features are desirable in a mechanism which must be rugged and fool proof for handling the forces developed in the operation of variable pitch propellers in large vessels requiring power plants in the thousands of horsepower.

The above-described action may be carried on at will by the operator for any forward or reverse pitch setting the blades, hub and controls are capable of. In every case the operator sets the desired pitch and the mechano-electrical servo system goes into action, following-up the operator's signal until the contact 133 lies between the contacts 127 and 128 at the null point, when the operator's wishes are satisfied.

It is within the scope of the invention to prevent abuse of the pitch control mechanism by introducing a non-race governor control in the main battery circuit, preventing any shift of pitch by the operator, until the engine or engines have been brought down to a given idling speed.

It should be understood that sudden relief of torque on an engine, such as would be caused by shifting pitch from a driving angle to a lesser angle nearing zero pitch, will tend to cause the engine or engines to race, being suddenly relieved of load.

Figure 3 therefore shows a fly-ball governor G driven from some rotating part of the power plant, having movable collar 150 and switch S connected between battery C and the circuit lead 120. At a given low speed range of the engine, the governor spring 151 holds collar 150 down to enforce contact across switch S, against centrifugal force, enabling the pitch control system to be energised. At a certain higher speed point, the fly-balls swing out, lifting the collar 150 away from flexible switch arm 152 and interrupting the battery current. Under these conditions, the operator cannot change pitch until the actual engine speed falls to the point where collar 150 remakes the battery circuit across switch S.

In marine engine installations, it is advisable to prevent overloading in internal combustion power plants, especially when the drive is equipped with a converter of torque resembling somewhat an infinitely variable ratio transmission, which effect is achieved with the variable pitch propeller.

Where flexibility of operation is desired, it is often required to provide a range of variable pitch in a propeller installation, having a higher maximum pitch than would be desirable to use with full throttle of the engine at the same time; and it is therefore desirable to interconnect the controls in such a way that when the pitch controller is placed in full forward pitch position, the engine throttle cannot be advanced to a more than a predetermined intermediate setting below full, and above normal idling.

Figure 5:
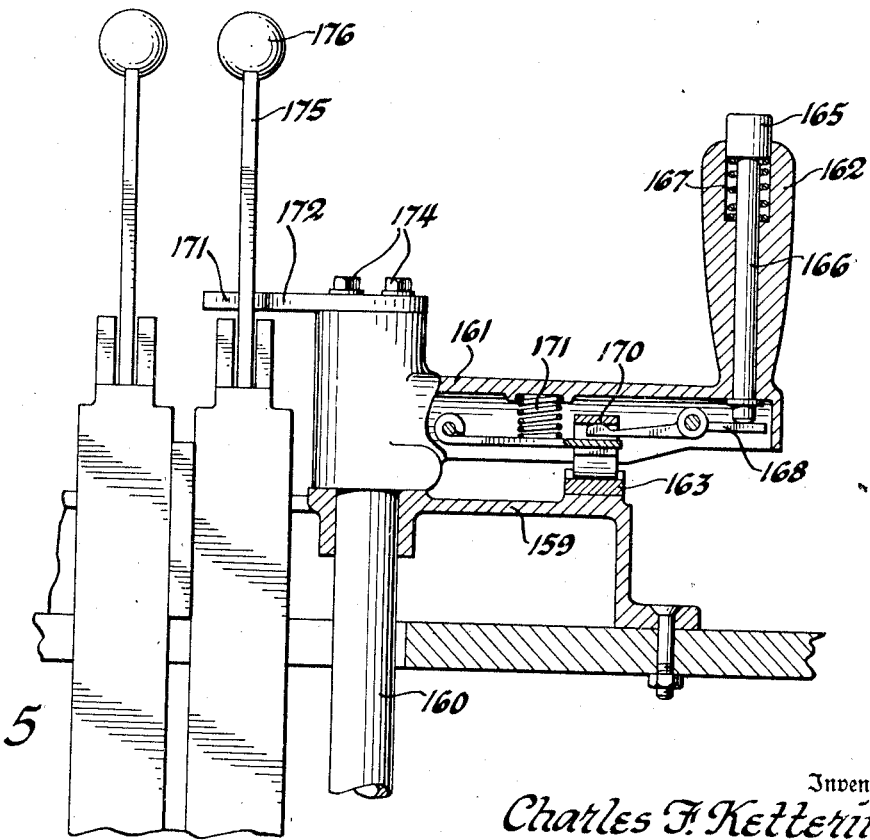
Figure 5 is a vertical view partly in section of the controls of Figure 4, for the pitch and throttle interlock system, taken on line 5—5 of Figure 4.

The present invention includes a control feature which provides the above characteristic, illustrated in Figures 4 and 5.

Figure 4 is a plan view of a pitch and throttle controller installation for a marine vessel having separate port and starboard power plant and propeller drive installations. Figure 5 is the vertical elevation of the structure shown in Figure 4.

A housing 159 is attached to the bulkheading in the pilot house of a vessel, and serves to mount the controls for both engines and both propellers. Since the right and left halves are identical in function and operation, the elements of the left half are not numbered, and the following description is therefore limited to the right half or starboard engine and drive installation.

Vertical shaft 160 coming up into the pilot house from below deck, passes through the bulkheading and through a guide hole in the housing 159, and has at its upper end an attached controller arm 161 adapted to rotate shaft 160 through a given arc of circumference. Shaft 160 is arranged to shift the control device D of Figure 2, the range of movement of handle 162 over sector plate 163 of Figure 4 corresponding to the desired range of movement of control device D. The sector plate 163 has forward and reverse pitch, and neutral positions marked on it for convenience of the operator.

The vertical handle 162 of the controller arm 161 is hollow and is equipped with a button 165 and punch rod 166 biased upward by recessed spring 167. The lower end of punch rod 166 is arranged to strike the adjacent end of pivoted lever 168, the other end of which operates snubbing brake 170 pivoted also on the underside of arm 161. Brake loading spring 171 recessed in the underside of arm 161 presses downward on the arm of brake 170 which holds the controller in any selected position until downward force applied against button 165 overcomes both springs 167 and 171 to release the brake, when the arm 161 can then be moved freely over the sector plate 163 to selected pitch positions.

The central portion of arm 161 is formed into a crown fitting over the upper end of shaft 160 to which it is attached, and has affixed plate 172, slotted at 173 for registry with studs 174.

The vertical arm 175 and knob 176 are for the purpose of adjusting the engine throttle, and as viewed in Figure 4, is shown in intermediate throttle setting position. The extreme upward position noted in dashed outline of the section of arm, is the full throttle position, and the lowermost position is for idling throttle.

The plate 172 is cut away at 177 to form a stop, and when the pitch controller 161 is placed in full forward pitch position, the plate intersects the motion of the throttle arm 175, preventing it from being advanced to full throttle setting.

The plate 172 is adjustable angularly, by loosening studs 174 and resetting, so that there is a predetermined limited maximum forward pitch setting of controller 161 corresponding to full throttle. This relationship may be determined by the power of the engine, the power absorption of the variable pitch propeller, and the load of the vessel, so that the engine is protected against lugging at full horsepower and overpitch setting of the propeller blades.

It is obvious that the throttle arm 175 and the controller arm 161 may be related such that the movement of the throttle arm 175 toward full throttle may shift the pitch control back to an intermediate pitch setting corresponding to the maximum pitch for a given peak power of the engine, thus enabling the operator to limit automatically the degree of forward pitch not only for maximum throttle, but also for any intermediate range of settings. The mechanical relationships between the arms may be termed mutually reactive.

To achieve this, it is only necessary that the mechanical advantage of the throttle arm 175 over the plate 172 be sufficient to overcome the effect of brake loading spring 171 on brake 170 so that the controller arm 161 positioning is always mastered by the throttle arm setting, so as to compel the limiting of forward pitch in the manner above described.

Conversely it will be seen that if the throttle arm is already set in full throttle position, with the controller arm in a corresponding intermediate position, the movement of the controller arm 161 to maximum forward pitch position will rotate plate 172 counterclockwise, forcing the throttle arm 175 back to an intermediate engine speed position in which the power and load relationships already predetermined for the maximum propeller pitch are satisfied.

Whereas in the past, pitch presetting devices of this general character have employed separate pitch selection and "execute" controls, the present invention yields the advantage of automatic correction of pitch overtravel and pitch drift, without any operator attention whatever, so that for example in small fast military craft, the pilot or operator may devote his attention to more urgent duties and is not required to watch a pitch indicator. This feature is obtained by having the control circuits constantly and continuously energised. Since the motor load requirement is low, the current in the system is correspondingly low, and its loss tolerated.

In describing the above features, it is felt proper to call attention to the fact that while the interlocks between the pitch controller and engine throttle prevent engine overload, these only have to do with presetting effects of these controls, and do not have to do with the actual power conditions. It should be observed that the governor G of Figure 3 definitely blocks the mechano-electrical system of Figure 2 until the engine speed itself has fallen off to the point where switch S is energised, so that even if the operator is able to compel interaction between the throttle arm 175 and controller arm 161 of Figures 4 and 5, no change of pitch ever occurs until the governor G indicates a sufficiently low engine speed for the pitch changes to be made without shock.

While the controls described in Figure 2, or Figures 2 and 3 may be used separately from those shown in Figures 4 and 5 it is understood herein that the structure of Figures 4 and 5 may be used with that of Figures 2 and 3, as described just preceding, and further, that they may be duplicated for two-engine, two-propeller installations, without going beyond the scope of the present invention.

I claim:

1. In a variable pitch control system for marine vessels including a mechanism for controlling the forward and reverse pitch setting of rockable propeller blades; a driving shaft constantly driven for rotation in one direction, a propeller hub attached to said shaft, rockable blades pivoted in said hub to provide forward and reverse pitch setting thereof while equilibrating blade thrust and centrifugal force over a given speed range of said shaft, a control member, a longitudinally movable pitch shift actuating means extending through the central axial portion of said hub and operative to shift said blades synchronously between said forward and reverse settings, external operating mechanism connected to said shift actuating means subject to the reaction of said force while effective to hold said means in selected pitch positions between said settings and operatively connected to said control member, auxiliary power means constantly connected to said mechanism for compelling actuation of said actuating means, control apparatus for said power means, a controller for said apparatus including said member, a control device embodying relatively movable coacting elements connected to said apparatus and having one element directly connected to said actuating means and the other element being movable by said member over a range of movement corresponding to the forward and reverse pitch range of said mechanism and constantly and continuously effective upon the said apparatus to initiate and to cut off the actuation by said power means of said operating mechanism in accordance with the operator-selected settings of said member-moved element in consecutive forward and reverse pitch-controlling positions, said first element acting with the completion of pitch shift actuation by said power means and by said mechanism to cut off the said actuation, and whereby the reactive force upon said operating mechanism tending to change blade pitch is constantly compensated for by automatic readjustment of pitch control exercised by the said first-named element initiating the actuation of said power means in response to a pitch setting by said force differing from the instant pitch setting of said second named element by said member.

2. In the combination such as described in claim 1, the subcombination in which a governor responding to the speed of the propeller and means operated by said governor and connected to said control apparatus are effective to limit the action of the auxiliary power means to a predetermined speed range through operative interruption of the power of the said power means, by movement of the said speed-operated means.

3. In the combination such as described in claim 1 the subcombination in which the said power means consists of a reversible electric motor constantly connected to said operating mechanism through a drive-transmitting gearing arranged to absorb the residue of the reactive forces resulting from the driving conditions of the propeller, in which the said gearing is formed to resist such forces and to hold the said actuating means against said forces except when the said motor is energized, and in which the said control member upon movement beyond the inactive position of said controller immediately initiates an automatic shift of the pitch setting to correspond to the control position of said first named element.

4. In the combination described in claim 1, the sub-combination of a connection between the said element of said control device operated by said manually-moved controller and a manually-operable locking means coacting with said controller effective to lock the device in an infinite number of forward and reverse pitch positions, in any one of such positions the aforesaid relative motion coaction between said elements being effective to cause automatic correction of pitch by said actuating means.

5. In a combination such as described in claim 1, the sub-combination of a power plant driving said shaft, a speed control for said power plant, and a connection for the said controller coacting with said speed control operative when the controller is placed in given advanced pitch presetting position to limit the range of movement of said speed control toward higher power plant speed settings.

6. In a combination such as described in claim 1, the sub-combination of a power plant driving said shaft, a speed control for said power plant, and a connection for the said controller coacting with said speed control effective when the controller is set in advanced forward pitch positions, while the speed control is moving toward higher power plant speed positions, to compel the controller to shift to an intermediate forward pitch position.

7. In a combination such as described in claim 1, the sub-combination of a power plant driving said shaft, a speed control for said power plant and a connection for the said controller coacting with said speed control operative to prevent full advanced pitch setting of said controller until the said speed control occupies a position intermediate full speed and idling speed positions.

8. In a combination such as described in claim 1, the sub-combination in which the said controller is manually operated, the said auxiliary power means consists of a reversible electric motor controlled and energised by separate electrical circuits for forward or reverse rotation, a connection between the said control device and the said controller operative to make and break said circuits in accordance with said controller motion and with completion of actuation by said mechanism, and a separate selective circuit control means effective to open and close the said circuits to said motor to prevent the action of said power means.

9. In a combination such as described in claim 1, the sub-combination in which the said controller is manually operated; in which the said auxiliary power means consists of a reversible electric motor controlled by separate electric circuits for forward and reverse rotation, said circuits including separate relays, and a connection between the said element of said control device and said controller operative to make and break said circuits including said relays, in accordance with increasing and decreasing pitch settings of said control device, and cut-off control means for the power of said power means effective to hold existing pitch indefinitely during operation when said cut-off means is made effective.

10. In a combination such as described in claim 1, the sub-combination of reaction force absorbing means in the drive of said power means to said operating mechanism and adapted to yield under high forces with overtravel, and the provision of an element having relative motion interaction in said control device with respect to an element moved by said mechanism connected to control said power means and operative upon such overtravel by said mechanism to set the auxiliary power means into motion to correct for said overtravel.

11. In variable pitch propeller control devices, a shaft, a propeller on said shaft equipped with a plurality of blades adjustable simultaneously to common pitch angle positions between forward and reverse pitch settings, pitch control means for said propeller, externally operable mechanism connected to adjust the pitch of said blades and to hold normally to a pitch adjustment determined by said means in either forward or reverse pitch comprising a single pitch-adjusting member movable longitudinally, a rotatable threaded shaft arranged parallel to the line of motion of said member, a traveler nut affixed to shift to forward and reverse pitch positions with said member in accordance with rotation of said shaft, a reversible electric motor geared to rotate said shaft at a mechanical advantage, a current supply for said motor, a power circuit for said motor including two separate connections from said supply for establishing forward and reverse rotation of said shaft, a relay in each of said connections, a controller device including a contactor and spaced apart contacts arranged to deliver actuating current immediately to one or the other of said relays through selective relative contact movement for energising the said motor in either forward or reverse rotation, and a follower element moved by and with said traveler nut and effective to interrupt the flow of current to either relay upon positioning of said nut such that the contactor occupies the space between said contacts.

12. In variable pitch propeller control systems for vessels, in combination, a power plant, a speed control for said power plant, a power shaft driven by said power plant, a propeller hub driven by said shaft and fitted with blades shiftable between forward and reverse pitch positions, a single actuating means reciprocable within said hub and adapted to shift said blades synchronously between said positions, a traveler nut connected to reciprocate with said means, a screw shaft arranged to shift said nut reciprocally, a reversible electric motor geared to drive said screw shaft and to traverse said nut, a source of electric current, two energising circuits for causing forward and reverse rotation of said motor and consequent traversing of said nut to forward and reverse pitch settings to shift the pitch of said blades, an electric relay for each of said circuits connecting same to said source and arranged for selective operation of each relay to the exclusion of the other, control circuits for each of said relays individually energisable and individually connected to the said source, a current controlling member moved by traversing motion of said nut, a selective control device connected to said control circuits and coacting with said member, effective immediately upon selective motion to energise one or the other of said relays for initiating rotation of said motor for traversing said nut to a new position for resetting said blades in a new pitch position a speed responsive governor driven by said power plant, a switch arranged to interrupt and connect the current of said source to said energising circuits, and means operated by said governor when subject to speed response of predetermined values to activate said switch.

13. In a combination such as described in claim 12, the subcombination in which the said speed control for said power plant coacts with said pitch control device to provide under advanced forward pitch settings thereof a limiting of the said speed control to a range of motion between intermediate and an idling speed settings, and is incapable of being moved to a setting compelling high speed of said power plant.

14. In a combination such as described in claim 12, the subcombination of coordinating mechanism operative under overtravel of said nut beyond the pitch setting determined by said control device to provide relative motion between the said device and said member to re-energize the said electric motor in the reverse direction of rotation from that previously preset and to stop said motion when the said member is reversely moved by the traversing motion of said nut to the pitch position determined by the said device.

15. In controls for variable pitch marine propellers an engine, an engine throttle, an engine throttle control, an engine power shaft, a variable pitch propeller hub driven by said power shaft and having articulated blades shiftable between forward and reverse shift positions, a mechanism actuating the shift of said blades, a reversible electric motor geared to drive said mechanism for reciprocating said blades between said positions and geared to stop said blades at intermediate pitch settings therebetween, a member moved by said mechanism, control apparatus for said motor effective to compel actuation thereby of said mechanism, and adapted to connect said motor with a source of electrical power, a master control switch for said motor connected to said apparatus and having two spaced apart contacts, a coacting contact normally occupying the space between the said first-named contacts, and movable by said member to establish a circuit through said apparatus through one or the other of said spaced apart contacts for compelling increasing or decreasing pitch change motion of said motor and said mechanism, means automatically effective to compensate for overtravel of said mechanism beyond a position in which said member occupies the space between said contacts and interlocking means including mutually reactive stop mechanism connecting the element of said switch having the said spaced apart contacts with the said engine throttle control coacting to establish a range of relative scalar positions for predetermined forward pitch and throttle settings in which for a given pitch setting of said switch the throttle is variable below a maximum engine speed value, and for a given higher pitch setting of said switch, the throttle is variable at below a lesser engine speed value than the first named value.

16. A marine vessel drive control apparatus, a control station, an engine throttle operating means located in the control station, a propeller device having blades shiftable to forward and reverse pitch positions actuated by reversible pitch shifting mechanism which includes power means automatically energized by a control connection made effective by intersection of relatively shiftable elements one of which is preset to occupy a desired pitch establishing position and the other of which is directly moved with changes of pitch, a pitch control member connected to said first named element and located in said station operative to establish said automatic energization, mutually reactive stop mechanism connecting said throttle operating means and said member and including a movable stop operated by said member and arranged to be normally effective to limit the advanced throttle setting of said throttle operating means over a range of pitch settings of said member, said mechanism being effective to reduce pitch settings of said member upon motion of said throttle operating means toward advanced throttle position, and locking means for said member operative to hold it in a preset driving pitch position while limiting the said advanced throttle setting of said throttle operating means to a predetermined advanced throttle opening.

17. In a marine vessel equipped with a speed controlled engine, a reversible pitch propeller having blades movable to forward, neutral and reverse pitch positions, a ship control station, a combined throttle and pitch control mechanism comprising an engine throttle, a throttle control member located at said station, a propeller pitch control member located adjacent said throttle control member and movable to forward, neutral and reverse pitch positions, and interlocking means including mutually reactive stop mechanism connecting said throttle control member and said pitch control member effective to coordinate directly the action of said members to limit and to hold the advanced speed positioning of said throttle control member for predetermined selected forward or reverse pitch setting of said pitch control member, said mechanism being operative to reduce pitch settings of said pitch control member upon motion of said throttle control member toward advanced throttle position, and means to lock the said pitch control member in a plurality of selected forward or reverse pitch positions.

18. In marine vessel drives, a reversible propeller including blades pivoting between forward and reverse pitch settings, a pitch shifting device for said blades, a power means connected to said device to shift the pitch of said blades, a control means for said power means, a follow up mechanism controlling the operation of said power means, leader elements included in said mechanism, a follower element connected to control said power means, power feed connections for said means controlled by said elements, power cut-off connections for said means controlled by said follower element, a mechanical connection moved by said power means directly shifting the positioning of said follower element, a speed control for said engine, a pitch control connected to said leader elements, an interlock mechanism operative to limit the setting of said speed control for given settings of said pitch control, a governor driven by said engine, a speed responsive element moved by said governor connected to the control for said power means and effective to prevent operation of said power means at speeds above a predetermined speed.

CHARLES F. KETTERING.